United States Patent
de Navas (10) Patent No.: US 12,259,646 B1
(45) Date of Patent: Mar. 25, 2025

(54) REAR PROJECTION SCREEN FOR A DISPLAY DEVICE

(71) Applicant: Oliver Moon de Navas, Fontana, WI (US)

(72) Inventor: Oliver Moon de Navas, Fontana, WI (US)

( * ) Notice: Subject to any disclaimer, the term of this patent is extended or adjusted under 35 U.S.C. 154(b) by 0 days.

(21) Appl. No.: 18/818,061

(22) Filed: Aug. 28, 2024

Related U.S. Application Data (60) Provisional application No. 63/649,936, filed on May 20, 2024.

(51) Int. Cl.
    G03B 21/58 (2014.01)
    G03B 21/60 (2014.01)

(52) U.S. Cl.
    CPC ............. *G03B 21/58* (2013.01); *G03B 21/60* (2013.01)

(58) Field of Classification Search
    CPC ...... G03B 12/58; G03B 21/60; D03D 1/0017; D03D 13/004; D03D 15/15; D03D 15/547
    See application file for complete search history.

(56) References Cited

U.S. PATENT DOCUMENTS

| | | | | |
|---|---|---|---|---|
| 4,017,152 A | * | 4/1977 | Allen | G03B 21/58 248/165 |
| 4,323,301 A | * | 4/1982 | Spector | G03B 21/585 359/443 |
| 5,894,878 A | * | 4/1999 | Morgan | G06F 1/1603 160/354 |
| 6,846,083 B1 | * | 1/2005 | Mylar | B41M 5/52 348/835 |
| D567,245 S | * | 4/2008 | Edwards | D14/448 |
| D634,327 S | * | 3/2011 | Connard | D14/448 |
| 2004/0188041 A1 | * | 9/2004 | Cameron | G03B 21/58 160/351 |
| 2023/0212795 A1 | * | 7/2023 | Hicks | A43B 23/027 36/45 |

FOREIGN PATENT DOCUMENTS

JP  2015192791 A  *  11/2015

* cited by examiner

Primary Examiner — Christopher E Mahoney
(74) Attorney, Agent, or Firm — Michael D. Eisenberg (57) ABSTRACT

A rear projection screen for a display device includes a flexible while cloth material. The flexible white cloth material has a rear surface and a front surface, and is configured to absorb light emitted by a display device behind the rear surface and to display the light absorbed on the front surface for viewing ahead of the display device, while placed in front of the display device and in contact with a front of the display device.

19 Claims, 10 Drawing Sheets

REAR PROJECTION SCREEN FOR A DISPLAY DEVICE

CROSS-REFERENCES TO RELATED APPLICATIONS

The present application claims priority from U.S. Provisional Application Ser. Number filed on May 20, 2024, which is hereby incorporated herein by reference in its entirety.

TECHNICAL FIELD

The present invention relates to projection screens for display devices, and more specifically, but not limited to, projection screens for televisions, computer monitors, tablets, and smart phones.

BACKGROUND OF THE INVENTION

The present invention is made for display devices, such as television (TV) screens, computer screens, tablet screens, and smart phone screens. Televisions are bigger and brighter than ever and also sharper than ever due to the ever-increasing pixel count. Many TVs and screens are purchased too large for the space and environment that they occupy. This causes the light exposure from the TV to be greater than needed for the viewer and may cause headaches and eye irritation.

One solution is to turn down the brightness of the display or set the display screen to "natural mode". This reduces the intensity of the light from the display, but high exposure to light in the room still remains, creating a less pleasurable viewing experience.

Another solution involves installing rear lights and ambient lighting to engulf the display with external light so as to allow the eyes to be more relaxed by having ambient lighting.

Other display devices, such as tablets and smartphones, though smaller, also cause high light exposure, especially in the dark, and may cause eye strain.

The present invention addresses the above problems.

BRIEF SUMMARY OF EMBODIMENTS OF THE INVENTION

An aim of the present invention is to provide a rear projection screen for a display device. The projection screen covers the display device, so that the image from the display device is projected onto the projection screen from the back of the projection screen and is displayed on the front of the projection screen for viewing. This softens the sharpness of display device and decreases light exposure. This creates a rear projection effect from the display device to the projection screen, allowing for a softer viewing experience and more relaxed view for the viewer's eyes.

Another aim of the present invention is to provide a rear projection screen for a display, which can cover the display while the display is off, to create a clean white space upon which images or videos can be projected by mini projectors placed in front of the rear projection screens.

Therefore, an aspect of some embodiments of the present invention relates to a rear projection screen for a display device, comprising a flexible white cloth material and a fastening element. The flexible white cloth material has a rear surface and a front surface and is configured to be placed in front of a display device and to absorb light emitted by the display device behind the rear surface and to display the light absorbed on the front surface for viewing ahead of the display device. The fastening element is configured to removably fasten the cloth material to the display device and keep the cloth material taut in front of the display device and in direct contact with a front of the display device while fastened to the display device.

In a variant, the fastening element comprises at least one strap joined to the cloth material. In use, the cloth material covers the front of the display device while leaving an opening at a rear of the display device, while the at least one strap extends along the rear of the display device and is connected to the cloth material at two edges of the opening.

In another variant, the at least one strap is elastic.

In yet another variant, the at least one strap comprises two segments joined to the cloth material at opposite edges of the opening, the segments having respective securing mechanisms configured to cooperate with each other to secure the segments together at a desired location along the segments.

In a further variant, the securing mechanisms comprise hook-and-loop fasteners.

In yet a further variant, the rear projection screen is in the form of a sleeve configured to cover the display device from front, top, and at least part of a rear, and having an opening on the bottom for fitting over the display device. The sleeve has a front portion and a rear portion. The front portion comprises the cloth material. At least part of the rear portion comprises the fastening element, wherein the fastening element comprises an elastic fabric, such that in use, the elastic fabric contacts a rear of the display device and is configured to keep the front portion taut and in contact with the front of the display device via elastic force.

In a variant, the fastening element comprises a plurality of first securing units and a plurality of second securing units. The first securing units are configured to be fixedly joined to a back of the display device. The second securing units are fixedly joined to the cloth material and configured to be removably joined to the first securing units to removably secure the cover to the display device.

In another variant, the first and second securing units comprise hook-and-loop fasteners.

In yet another variant, the cloth material is: stretchable in a first direction and not stretchable in a second direction perpendicular to the first direction; or stretchable in the first direction and in the second direction.

In a further variant, the cloth material does not crease when crumpled up.

In yet a further variant, the cloth material comprises a first fabric and elastane, wherein the first fabric comprises at least one of: viscose, bamboo, nylon, tnt, cotton, polycotton, polyester, and polypropylene.

In a variant, the cloth material comprises 90%-99% of the first fabric and 1%-10% of elastane by weight.

In another variant, the cloth comprises at least one of the following types of fabric:
 a. poplin 1/1 weave ratio, NE 50/1×50/1+d40, 53×27, weight 105 gsm, 97% cotton+3% elastane;
 b. poplin 1/1 weave ratio, NE 60/1×60/1, 66×27, weight 102 gsm, 97% cotton+3% elastane;
 c. sateen 4/1 weave ratio, NE 60/1×60/1+d30, 78×33, weight 117 gsm, 97% cotton+3% elastane;
 d. twill 2/1 weave ratio "S", CM30×CD24+D70, 36×24, weight 168 gsm, 97% cotton+3% elastane;
 e. twill 2/1 weave ratio "S", CM30×CD24+D70, 36×24, weight 168 gsm, 96% cotton+4% elastane, tumbled.

Another aspect of some embodiments of the present invention relates to a rear projection screen for a display device comprising a flexible white cloth material. The flexible white cloth material has a rear surface and a front surface, and is configured to absorb light emitted by a display device behind the rear surface and to display the light absorbed on the front surface for viewing ahead of the display device, while placed in front of the display device and in contact with a front of the display device.

In a variant, cloth material is: stretchable in a first direction and not stretchable in a second direction perpendicular to the first direction; or stretchable in the first direction and in the second direction.

In another variant, the cloth material does not crease when crumpled up.

In yet another variant, the cloth material comprises a first fabric and elastane, wherein the first fabric comprises at least one of: viscose, bamboo, nylon, tnt, cotton, polycotton, polyester, and polypropylene.

In a further variant, the cloth material comprises 90%-99% of the first fabric and 1%-10% of elastane by weight.

In yet a further variant, the cloth comprises at least one of the following types of fabric:
  a. poplin 1/1 weave ratio, NE 50/1×50/1+d40, 53×27, weight 105 gsm, 97% cotton+3% elastane;
  b. poplin 1/1 weave ratio, NE 60/1×60/1, 66×27, weight 102 gsm, 97% cotton+3% elastane;
  c. sateen 4/1 weave ratio, NE 60/1×60/1+d30, 78×33, weight 117 gsm, 97% cotton+3% elastane;
  d. twill 2/1 weave ratio "S", CM30×CD24+D70, 36×24, weight 168 gsm, 97% cotton+3% elastane;
  e. twill 2/1 weave ratio "S", CM30×CD24+D70, 36×24, weight 168 gsm, 96% cotton+4% elastane, tumbled.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
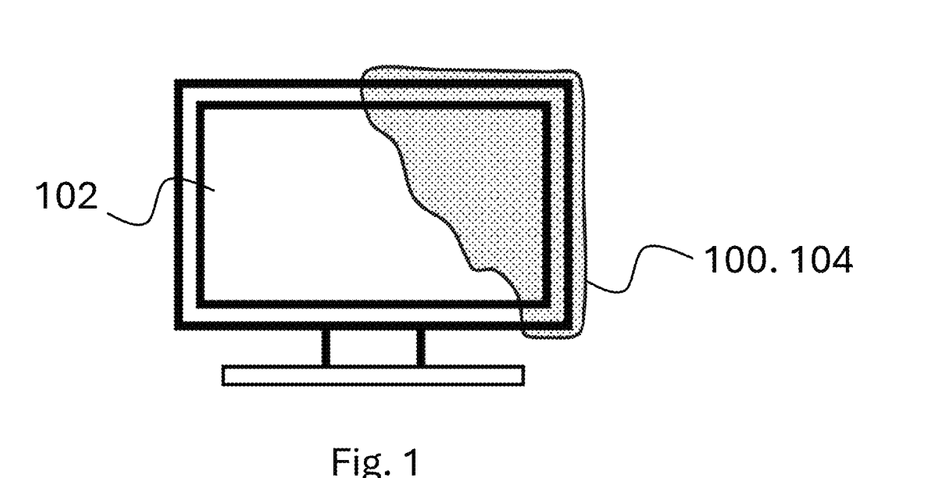
FIG. 1 illustrates a front of a display device (in the form of a TV or a monitor) partially covered by a rear projection screen of the present invention.
Figures 2, 3:
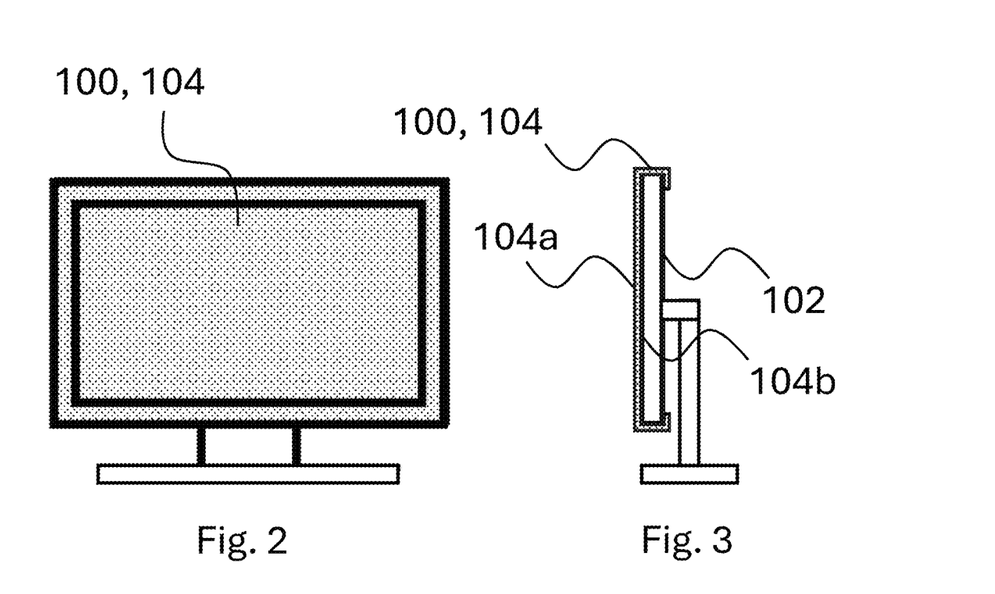
FIG. 2 illustrates the front of the display device (in the form of a TV or a monitor) completely covered by a rear projection screen of the present invention.
FIG. 3 is a side-cross sectional view of the display device (in the form of a TV or a monitor) covered by a rear projection screen of the present invention.

Referring now to the drawings, 1 FIG. 1 illustrates a front of a display device (in the form of a TV or a monitor) partially covered by a rear projection screen of the present invention. FIG. 2 illustrates the front of the display device (in the form of a TV or a monitor) completely covered by a rear projection screen of the present invention. FIG. 3 is a side-cross sectional view of the display device (in the form of a TV or a monitor) covered by a rear projection screen of the present invention.

According to some embodiments of the present invention, a rear projection screen 100 is provided for a display device 102. The rear projection screen 100 includes a compliant/flexible white cloth material 104 having a rear surface 104a and a front surface 104b. The white cloth material 104 is placed in front of the display device with the rear surface in contact with a front of the display device, so as to absorb light emitted by the display device 102 behind the rear surface 104a and to display the light absorbed on the front surface 104b to be viewed ahead of the display device.

When the cloth material is taut against the front of display device 102, the cloth material 104 attenuates light pollution in the room and attenuates light rays directly reaching to the viewer. The rear projection screen 100 creates a rear projection effect (projection of an image from the rear) using the full brightness of the TV, and thus allows for a softer viewing experience, much like a regular frontal projection view would be, for example in a cinema. Rear projection allows a viewer to watch the projection while standing directly in front of the display device, without causing a shadow that would normally be cast from a projector in a frontal projection setting. The use of the rear projection screen 100 of the present invention enhances the viewing experience of a person watching a video or images in the dark by reducing the direct light exposure from the screen significantly, while still maintaining a clear view. Instead, the viewer views the images projected onto the rear projection screen as indirect light displayed on the rear projection screen. Light from the display is absorbed by the rear surface of the rear projection screen and displayed on the front surface thereof. Another one of the advantages of the rear projection screen is the reduction of blue light reaching the viewer's eye.

The cloth material 104 is white and dense enough and thick enough to allow the light to fill each small space. Fabric that is too light, thin, or transparent allows light emitted from the display device to penetrate the cloth material and directly reach the viewer's eyes. The cloth material 104 of the present invention is dense enough to absorb the light emitted by the display device. In a non-limiting example, the density of the cloth material is between about 100 and about 250 grams per square meter (gsm). An example of a subrange of the thickness of the cloth material is about 100-200 gsm. In a non-limiting example of the present invention, the thickness of the cloth material is between about 1 mm and about 10 mm. An example of a subrange of the thickness of the cloth material is about 3-4 mm. It should be noted that all measurements may have an error of ±15%. It should be understood that the word "white" refers to any shades and hues of white, and may include, in non-limiting examples, colors known as pure white, off white, white smoke, eggshell, daisy, porcelain, pearl, and chiffon.

At the same time, the rear projection screen 100 is adaptable and removable to be easily placed on and off the display device without harming the display device. When not in use, the rear projection screen of the present invention can be rolled up like a sock and put into a pouch until next use. Moreover, the cloth material 104 does not crease when crumpled up. For this reason, harder materials (such as canvas), which are the standard for projection viewing, are not used as the cloth material 104 of the rear projection screen 100 of the present invention. Harder materials are more difficult to properly tension, and when not in use cannot be bundled up and stored as easily as the present invention. Moreover, harder materials crease when crumpled.

It should be noted that the rear projection screen 100, when taut, can also be used for receiving images from a front projector located ahead of the front surface of the rear projection screen 100. For example, the rear projection screen 100 may be placed over a display device (e.g., a TV) to maintain the rear projection screen 100 taut. The display device is off. A front projector, such as a mini projector emits light which is displayed on the front surface of the rear projection screen 100, and can be viewed by a viewer.

For the above-mentioned reasons, the cloth material 104 may include elastane and one or more of the following fabrics: viscose, bamboo, nylon, tnt, cotton, polycotton, polyester, polypropylene. In a non-limiting example, the cloth material 104 includes 90%-99% of the first fabric and 10%-1% elastane by weight.

In some embodiments of the present invention, the first fabric includes cotton and forms 96-98% of the cloth material 104, while elastane forms 2-4% of the cloth material 104. Non limiting examples of the cloth material in which the first fabric is cotton may include:
  a. poplin, 1/1 weave ratio, NE 50/1×50/1+d40, 53×27, weight 105 gsm, 97% cotton+3% elastane;
  b. poplin, 1/1 weave ratio, NE 60/1×60/1, 66×27, weight 102 gsm, 97% cotton+3% elastane;

c. sateen, 4/1 weave ratio, NE 60/1×60/1+d30, 78×33, weight 117 gsm, 97% cotton+3% elastane;
d. twill, 2/1 weave ratio "S", CM30×CD24+D70, 36×24, weight 168 gsm, 97% cotton+3% elastane;
e. twill, 2/1 weave ratio "S", CM30×CD24+D70, 36×24, weight 168 gsm, 96% cotton+4% elastane, tumbled.

The material may be stretchable in a first direction and not stretchable in a second direction perpendicular to the first direction. For example, the material 104 may be stretchable horizontally and non-stretchable vertically. Alternatively, the material 104 may be stretchable vertically and non-stretchable horizontally. In some embodiments of the present invention, the material is bi-stretchable, i.e. stretchable in the first direction and in the second direction perpendicular to the first direction.

In some embodiments of the present invention, the rear projection screen 100 includes a fastening element to removably fasten the cloth material 104 to the display device 102 and keep the cloth material 104 taut in front of the display device and in direct contact a front of the display device while fastened to the display device. Keeping the cloth material taut is advantageous, as empty space between the cloth material and the front of the display device may cause bubbling of the cloth material, which would reduce the quality of the image reached by the user.

Figure 20A:
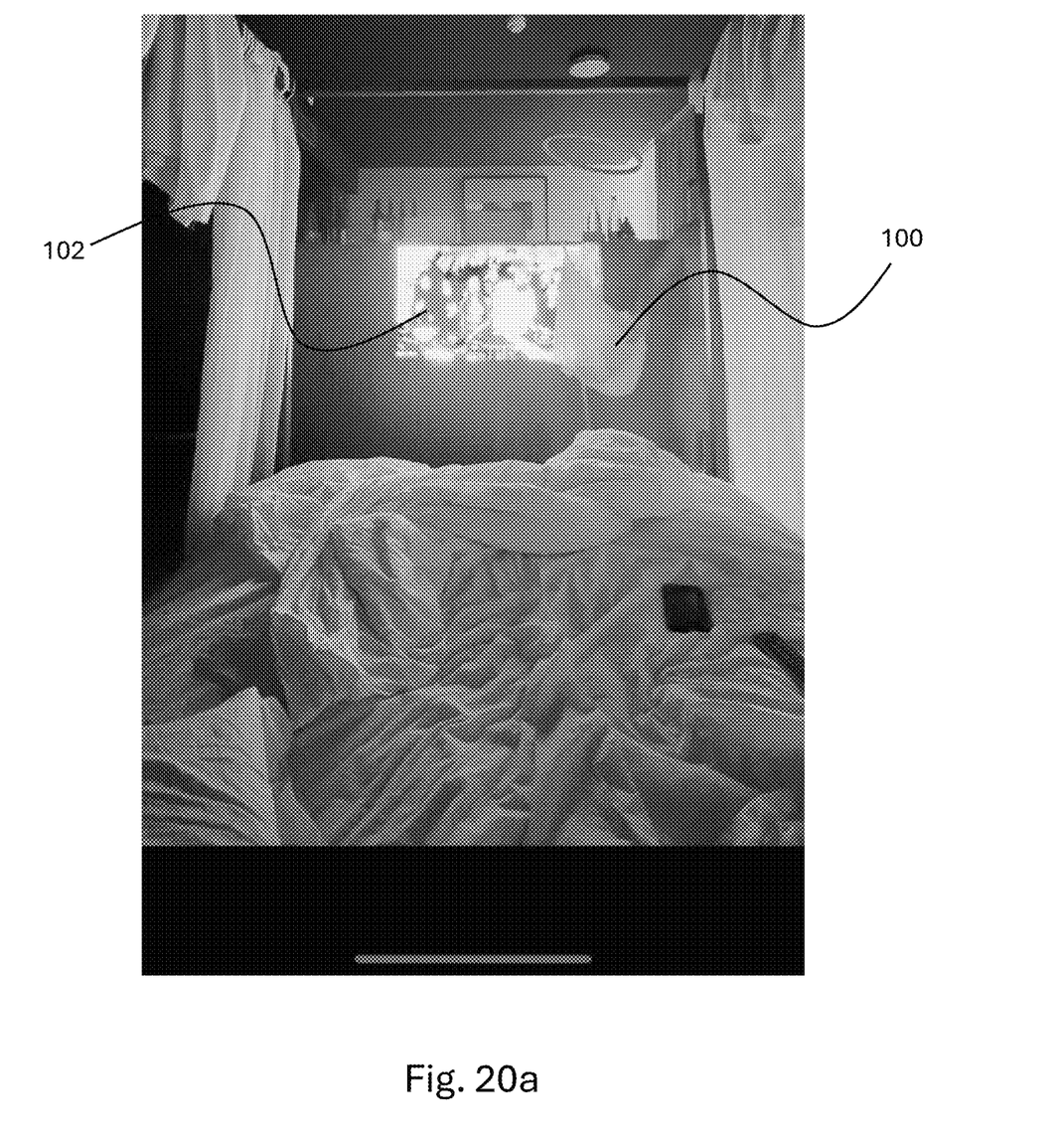
FIG. 20a is a photograph of a television screen not covered by a rear projection screen of the present invention.
Figure 20B:
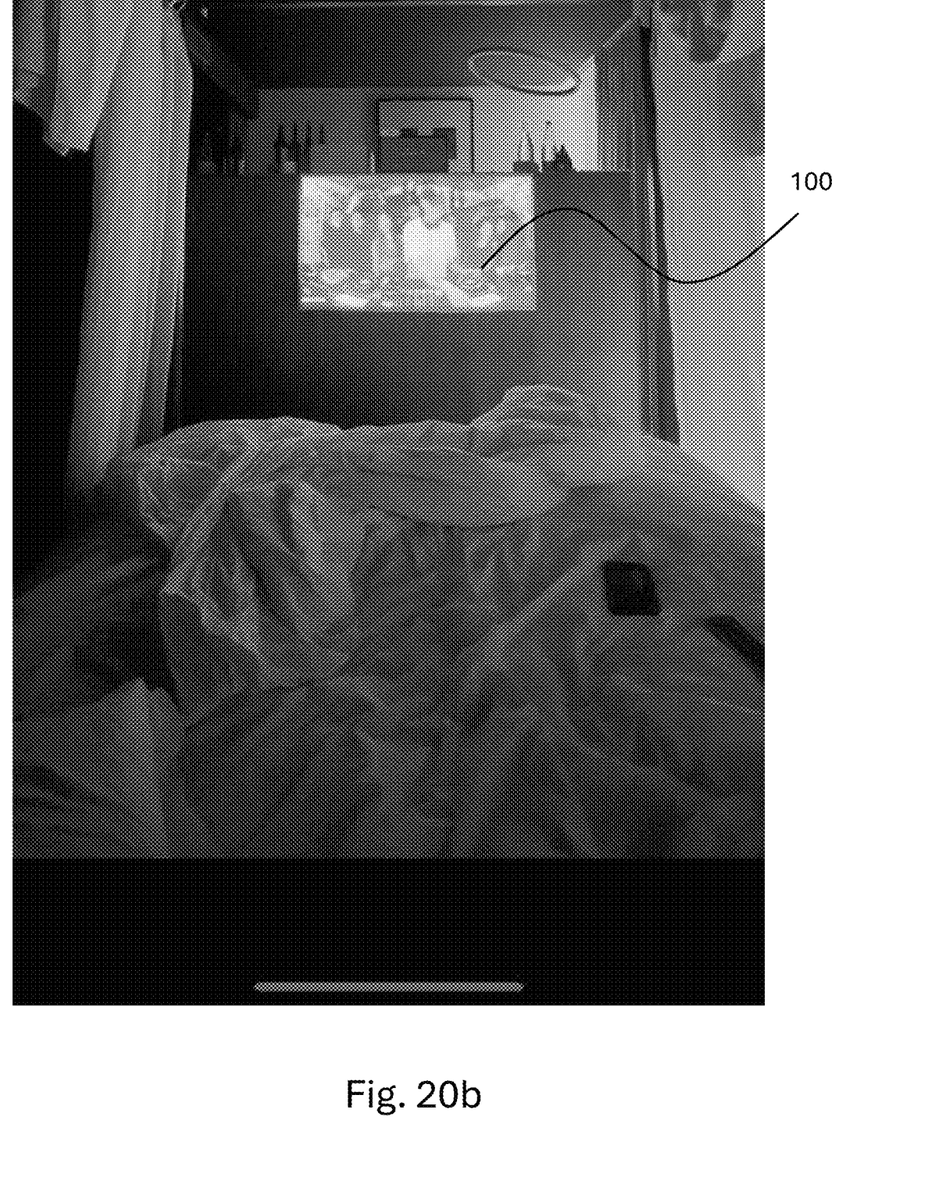
FIG. 20b is a photograph of the same television screen covered by a rear projection screen of the present invention.
Figure 21:
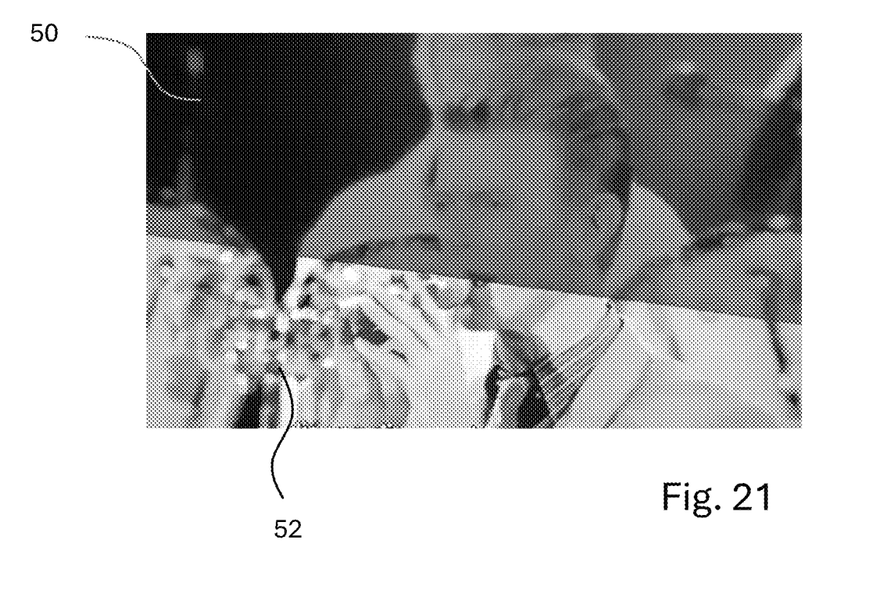
FIG. 21 is a photograph showing a television screen partially covered by the rear projection screen of the present invention.

FIG. 20a is a photograph of a television screen 102 not covered by the rear projection screen 100 of the present invention. FIG. 2-b is a photograph of the same television screen covered by the rear projection screen 100 of the present invention. FIG. 21 is a photograph showing a television screen partially covered by the rear projection screen of the present invention.

Comparing FIGS. 20a and 20b, It can be seen that in FIG. 20b, the image projected by the television screen to the viewer via the rear projection screen 100 retains good quality, while light pollution to the room and light exposure to the viewer are reduced compared to the FIG. 20b, in which the light is very bright, produces a high level of light illuminating the room, and has a high level of blue light. FIG. 21 shows the difference between a direct image 50 emitted directly by the television screen and a projected image 52 projected via the rear projection screen. The projected image 52 is softer and easier on the eye than the direct image 50.

Figure 4:
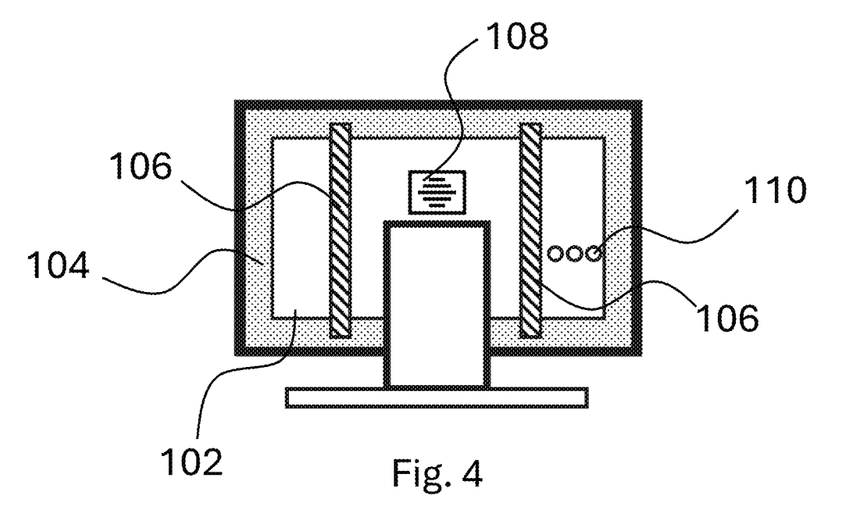
FIG. 4 illustrates the back of a display device (in the form of a TV or a monitor) covered by a rear projection screen having one or more vertical straps, according to some embodiments of the present invention.
Figure 5:
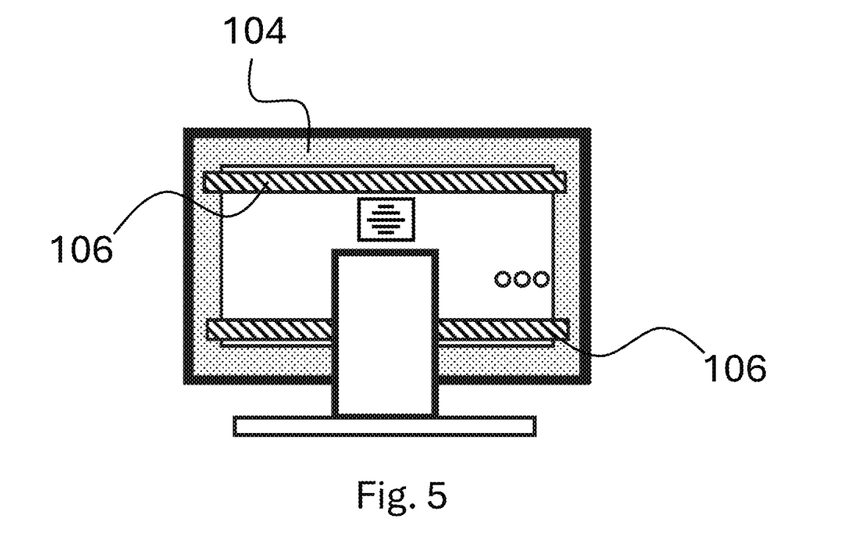
FIG. 5 illustrates the back of a display device (in the form of a TV or a monitor) covered by a rear projection screen having one or more horizontal straps, according to some embodiments of the present invention.

FIG. 4 illustrates the back of a display device 102 (in the form of a TV or a monitor) covered by a rear projection screen 100 having one or more vertical straps, according to some embodiments of the present invention. FIG. 5 illustrates the back of a display device (in the form of a TV or a monitor) covered by a rear projection screen having one or more horizontal straps, according to some embodiments of the present invention.

The fastening element may include at least one strap 106 joined to the cloth material 104. In use, the cloth material 104 covers the front of the display device 102, while leaving an opening at a rear of the display device 102. Each strap extends along the rear of the display device 102 and is connected to the cloth material 104 at two edges of the opening.

The strap may be elastic and may have a coefficient of elasticity as high or higher than the coefficient of elasticity of the cloth material. In this manner, the strap is configured to keep the front portion taut and in contact with the front of the display device via elastic force.

In some embodiments of the present invention, the strap may be vertical (FIG. 4) or horizontal (FIG. 5). In some embodiments, the strap's orientation is parallel to the direction in which the cloth material is stretchable. In this manner the strap's pull stretches the cloth material 104 and keeps the cloth material taut against the front of the display device.

The opening of the rear projection screen 100 at a rear of the display device 102 enables heat dissipation of the display device 102, preventing the display device from overheating. For example, the display device may have a vent 108 or a heat exchanger surface in the rear of the display device. Moreover, some televisions and monitors include sockets 100 at the rear of the display for connecting the televisions or monitors to signal sources or power sources. The opening of the rear projection screen enables access to the sockets 110.

Figure 6:
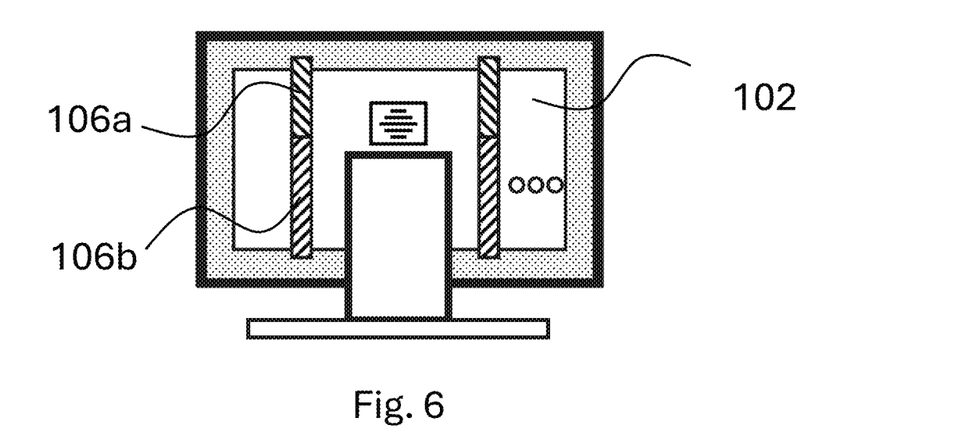
FIG. 6 illustrates the back of a display device (in the form of a TV or a monitor) covered by a rear projection screen having one or more straps, in which each straps includes two segments removably joinable to each other, according to some embodiments of the present invention.
Figure 7:
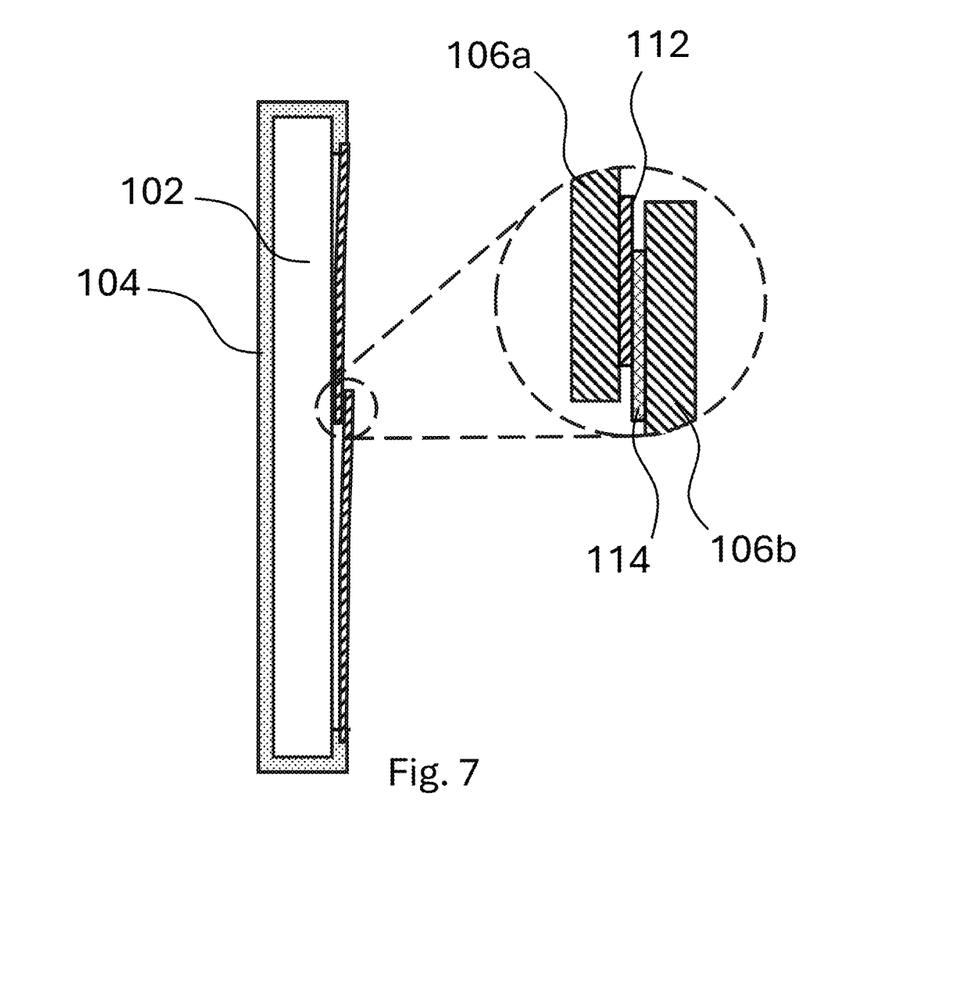
FIG. 7 is a side view of a display device (in the form of a TV or a monitor) covered by a rear projection screen having one or more straps, in which each straps includes two segments removably joinable to each other, according to some embodiments of the present invention.

FIG. 6 illustrates the back of a display device (in the form of a TV or a monitor) covered by a rear projection screen having one or more straps, in which each straps includes two segments removably joinable to each other, according to some embodiments of the present invention. FIG. 7 is a side view of a display device (in the form of a TV or a monitor) covered by a rear projection screen having one or more straps, in which each straps includes two segments removably joinable to each other, according to some embodiments of the present invention.

In some embodiments of the present invention, the strap 106 includes two segments 106a and 106b joined to the cloth material at opposite edges of the opening. The segments 106a and 106b have respective securing mechanisms configured to cooperate with each other to secure the segments together at a desired location along the segments. The segments may or may not be elastic.

In the non limiting example of FIG. 7, the securing mechanisms may include a hook-and-loop fastener. The hook portion 112 is fixed to the first segment 106a, while the loop potion 114 is fixed to the second segment 106b. By joining the first segment 106a to the second segment 106b at a desired location, the cloth material 104 is stretched over the front of the display device 102.

It should be noted that a different type of securing mechanism may be used. For example, the first segment may have a belt buckle while the second segment may have one or more punch holes for cooperation with buckle. Alternatively, the first segment may include a ratchet belt buckle to removably secure the second segment to the first segment.

Figure 8:
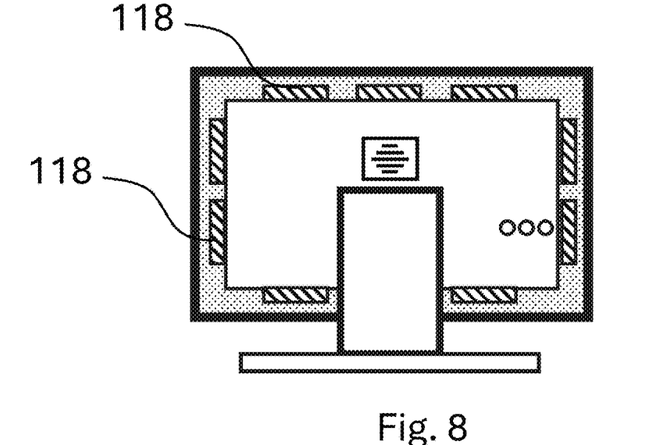
FIGS. 8 and 9 illustrates, respectively, the back and the side of a display device (in the form of a TV or a monitor) covered by a rear projection screen, wherein the rear projection screen includes securing units configured to be removably joined to respective securing units fixedly joined to the rear of the display device, according to some embodiments of the present invention.
Figure 9:
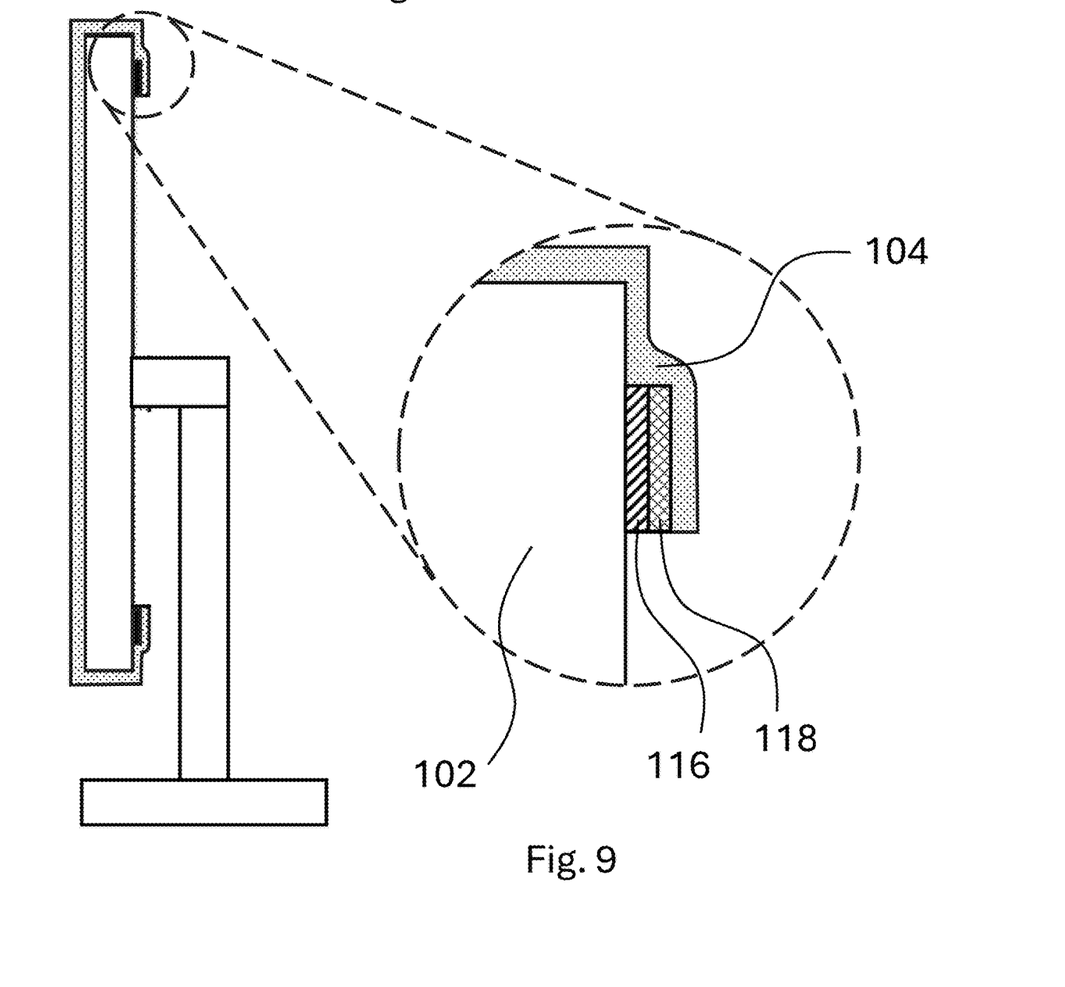

FIGS. 8 and 9 illustrate, respectively, the back and the side of a display device (in the form of a TV or a monitor) covered by a rear projection screen, wherein the rear projection screen includes securing units configured to be removably joined to respective securing units fixedly joined to the rear of the display device, according to some embodiments of the present invention.

In some embodiments of the present invention the fastening element includes a plurality of first securing units and a plurality of second securing units. The first securing units 116 are configured to be fixedly joined to a back of the display device 102. The second securing units 118 are fixedly joined to the cloth material 104 and are removably joinable to the first securing units 116 to removably secure the rear projection screen to the display device 102. The first and second securing units may include hook-and-loop fasteners.

The first securing units may be joined to the display device 102 by adhesive, for example. The cloth material 104 is joined to the display device by joining the second securing elements 118 to the respective first securing elements 116.

Figure 10:
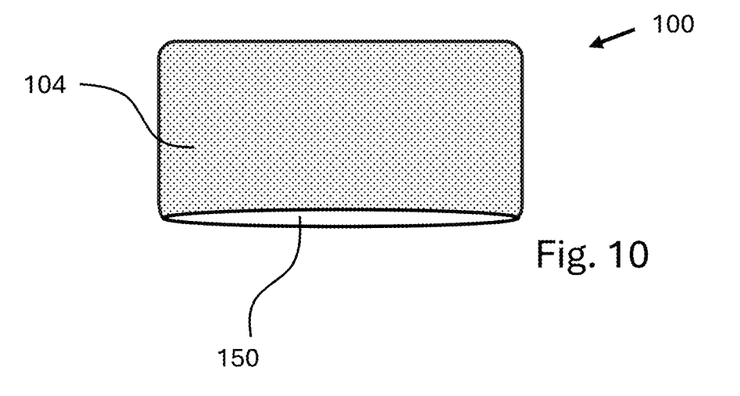
FIG. 10 is a front view of a sleeve-like rear projection screen for a computer monitor, according to some embodiments of the present invention.
Figure 11:
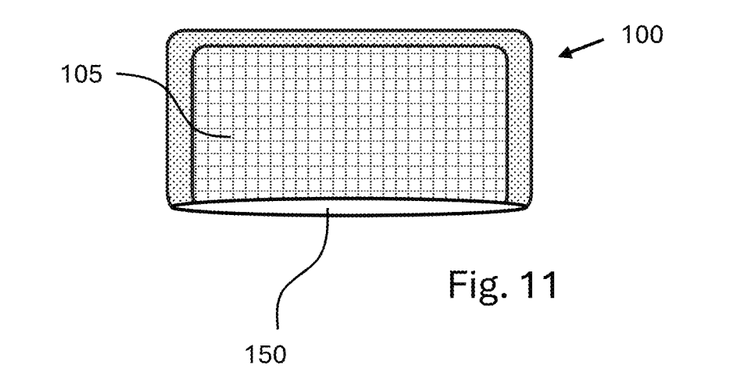
FIG. 11 is a rear view of a sleeve-like rear projection screen for a computer monitor, wherein the rear projection screen has an elastic fabric covering most of the rear portion of the rear projection screen, according to some embodiments of the present invention.
Figure 12:
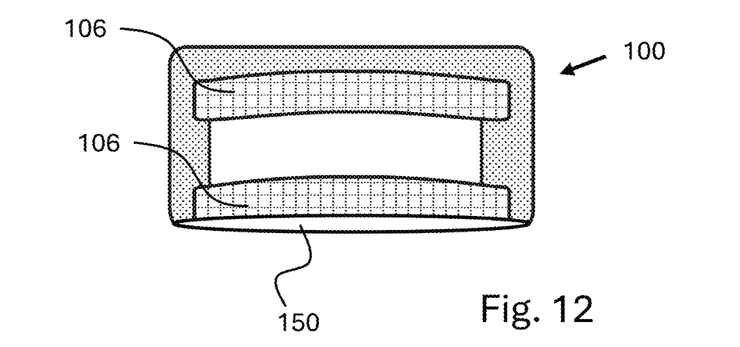
FIG. 12 is a rear view of a sleeve-like rear projection screen for a computer monitor, wherein the rear projection screen has an elastic fabric covering a part of the rear portion of the rear projection screen, according to some embodiments of the present invention.
Figure 13:
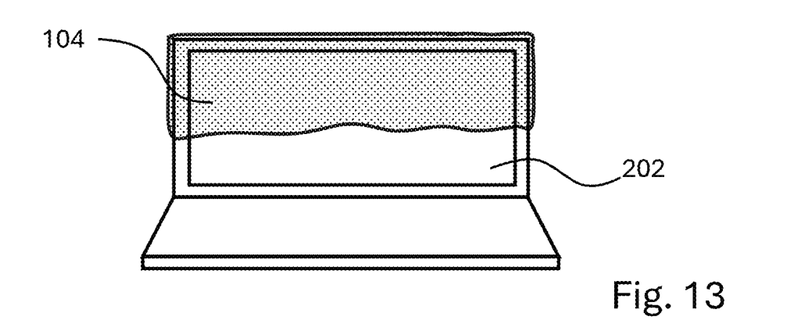
FIG. 13 illustrates the front of a laptop monitor partially covered by a sleeve-like rear projection screen of the present invention.
Figure 14:
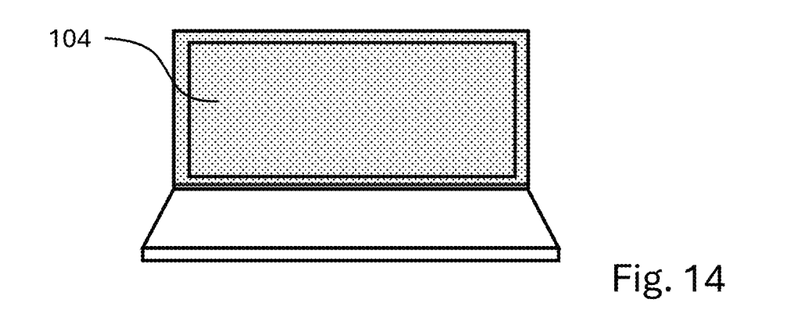
FIG. 14 illustrates the front of the laptop monitor completely covered by the sleeve-like rear projection screen of the present invention.
Figures 15, 16, 17:
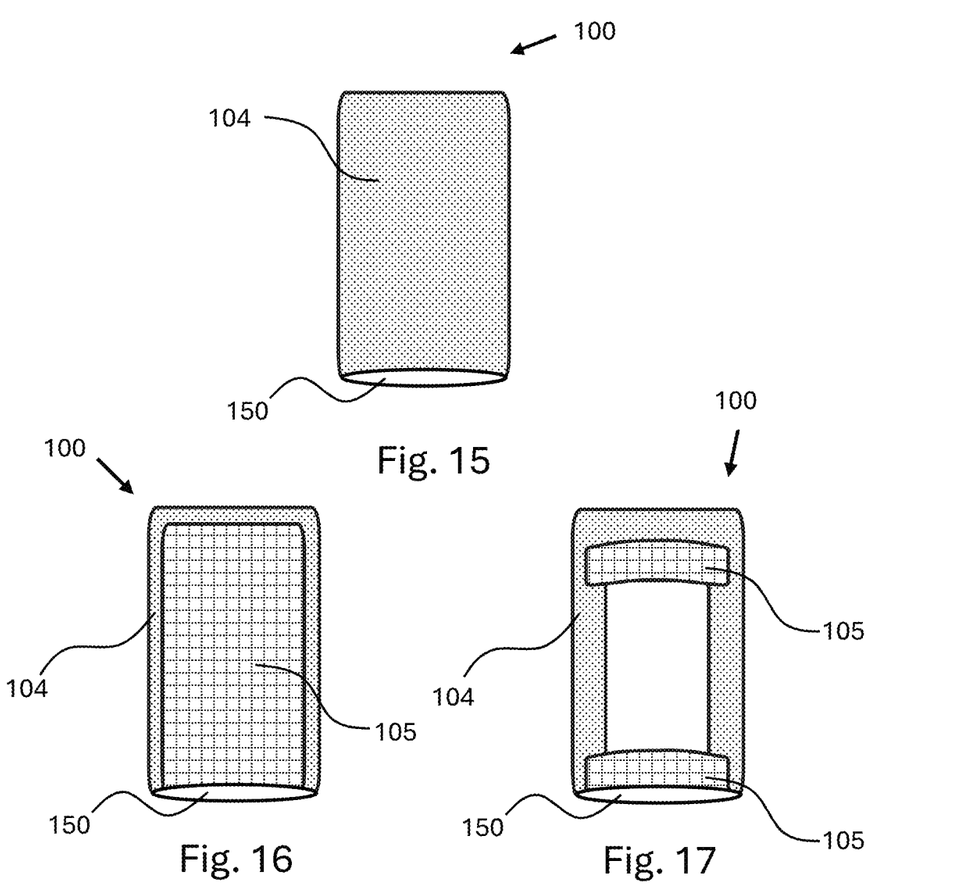
FIG. 15 is a front view of a sleeve-like rear projection screen for a smart phone, according to some embodiments of the present invention.
FIG. 16 is a rear view of a sleeve-like rear projection screen for a smart phone, wherein the rear projection screen has an elastic fabric covering most of the rear portion of the rear projection screen, according to some embodiments of the present invention.
FIG. 17 is a rear view of a sleeve-like rear projection screen for a smart phone, wherein the rear projection screen has an elastic fabric covering a part of the rear portion of the rear projection screen, according to some embodiments of the present invention.
Figure 18:
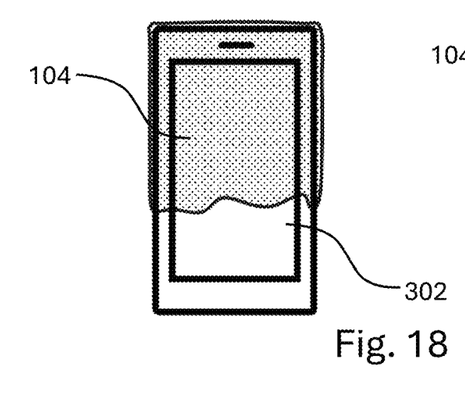
FIG. 18 illustrates the front of a smart phone partially covered by a sleeve-like rear projection screen of the present invention.
Figure 19:
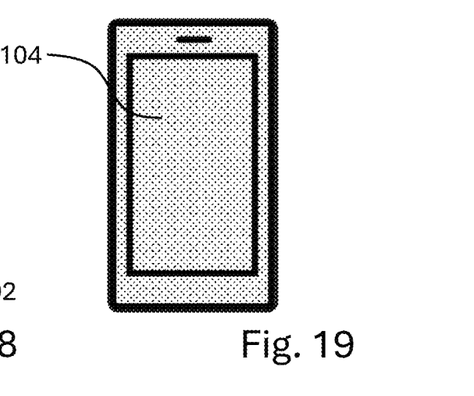
FIG. 19 illustrates the front of the smart phone completely covered by the sleeve-like rear projection screen of the present invention.

FIG. 10 is a front view of a sleeve-like rear projection screen for a computer monitor, according to some embodiments of the present invention. FIG. 11 is a rear view of a sleeve-like rear projection screen for a computer monitor 202, wherein the rear projection screen has an elastic an elastic fabric covering most of the rear portion of the rear projection screen, according to some embodiments of the present invention. FIG. 12 is a rear view of a sleeve-like rear projection screen for a computer monitor, wherein the rear projection screen has an elastic an elastic fabric covering a part of the rear portion of the rear projection screen, according to some embodiments of the present invention. FIG. 13 illustrates the front of a laptop monitor partially covered by a sleeve-like rear projection screen of the present invention. FIG. 14 illustrates the front of the laptop monitor completely covered by the sleeve-like rear projection screen of the present invention. FIG. 15 is a front view of a sleeve-like rear projection screen for a smart phone 302, according to some embodiments of the present invention. FIG. 16 is a rear view of a sleeve-like rear projection screen for a smart phone, wherein the rear projection screen has an elastic an elastic fabric covering most of the rear portion of the rear projection screen, according to some embodiments of the present invention. FIG. 17 is a rear view of a sleeve-like rear projection screen for a smart phone, wherein the rear projection screen has an elastic an elastic fabric covering a part of the rear portion of the rear projection screen, according to some embodiments of the present invention. FIG. 18 illustrates the front of a smart phone partially covered by a sleeve-like rear projection screen of the present invention. FIG. 19 illustrates the front of the smart phone completely covered by the sleeve-like rear projection screen of the present invention.

In some embodiments of the present invention, the rear projection screen 100 is in the form of a sleeve. The sleeve-like rear projection screen is adapted for computer monitors, tablets, and smart phones, which do not dissipate heat from the rear like televisions or monitors, and do not have sockets in the rear. Computer monitors dissipate heat via the computer, while tablets and smartphones may have vents at the bottom end.

The rear projection screen 100 is configured to cover the display device (computer monitor 202, smart phone 302, or tablet) from front, rear, and top, and has an opening 150 on the bottom for fitting over the display device. The sleeve has a front portion and a rear portion. The front portion includes the cloth material 104. In the rear portion, the cloth material is cut out and the cutout is covered by the fastening element, which includes an elastic fabric 105 joined to edges of the cutout in cloth material 104. In use, the elastic fabric 105 contacts the rear of the display device and is configured to keep the front portion taut and in contact with the front of the display device via elastic force.

The rear projection screen 100 may be slipped onto the display device from the top of the display device, like a sock, as seen in FIGS. 13 and 18, until the rear projection screen 100 fully covers the display device (FIGS. 14 and 18). The dimensions of the rear projection screen 100 are chosen so that insertion of the display device into the rear projection screen 100 causes stretching of the rear projection screen 100. The stretching causes the rear projection screen 100 to securely grasp the display device, preventing the rear projection screen from easily slipping away. The stretching also causes the cloth material 104 to be taut against the front of the display device.

In some embodiments of the present invention, the elastic fabric 105 extends along most of the rear of the rear projection screen (FIGS. 11 and 16). In some embodiments of the present invention, the elastic fabric 105 only extends along the bottom section of the rear of the rear projection screen (FIGS. 12 and 17). In some embodiments of the present invention, the rear of the rear projection screen may have an opening, to enable heat transfer between the rear surface of the display device and air (FIGS. 12 and 17).

What is claimed is:

1. A rear projection screen for a display device, comprising:
    a flexible white cloth material having a rear surface and a front surface and configured to be placed in front of a display device and to absorb light emitted by the display device behind the rear surface and to display the light absorbed on the front surface for viewing ahead of the display device;
    a fastening element configured to removably fasten the cloth material to the display device and keep the cloth material taut in front of the display device and in direct contact with a front of the display device while fastened to the display device.

2. The rear projection screen of claim 1, wherein the cloth material is:
    stretchable in a first direction and not stretchable in a second direction perpendicular to the first direction; or
    stretchable in the first direction and in the second direction.

3. The rear projection screen of claim 2, wherein:
    the fastening element comprises at least one strap joined to the cloth material;
    in use, the cloth material covers the front of the display device while leaving an opening at a rear of the display device, while the at least one strap extends along the rear of the display device and is connected to the cloth material at two edges of the opening.

4. The rear projection screen of claim 3, wherein the at least one strap is elastic.

5. The rear projection screen of claim 3, wherein the at least one strap comprises two segments joined to the cloth material at opposite edges of the opening, the segments having respective securing mechanisms configured to cooperate with each other to secure the segments together at a desired location along the segments.

6. The rear projection screen of claim 5, wherein the securing mechanisms comprise hook-and-loop fasteners.

7. The rear projection screen of claim 2, in form of a sleeve configured to cover the display device from front, top, and at least part of a rear, and having an opening on the bottom for fitting over the display device, wherein:
    the sleeve has a front portion and a rear portion;
    the front portion comprises the cloth material;
    at least part of the rear portion comprises the fastening element, wherein the fastening element comprises an elastic fabric, such that in use, the elastic fabric contacts a rear of the display device and is configured to keep the front portion taut and in contact with the front of the display device via elastic force.

8. The rear projection screen of claim 2, wherein the fastening element comprises:
    a plurality of first securing units configured to be fixedly joined to a back of the display device; and
    a plurality of second securing units fixedly joined to the cloth material and configured to be removably joined to the first securing units to removably secure the cover to the display device.

9. The rear projection screen of claim 8, wherein the first and second securing units comprise hook-and-loop fasteners.

10. The rear projection screen of claim 1, wherein the cloth material does not crease when crumpled up.

11. The rear projection screen of claim 1, wherein the cloth material comprises a first fabric and elastane, wherein the first fabric comprises at least one of: viscose, bamboo, nylon, tnt, cotton, polycotton, polyester, and polypropylene.

12. The rear projection screen of claim 11, wherein the cloth material comprises 90%-99% of the first fabric and 1%-10% of elastane by weight.

13. The rear projection screen of claim 1, wherein the cloth comprises at least one of the following types of fabric:
   a. poplin 1/1 weave ratio, NE 50/1×50/1+d40, 53×27, weight 105 gsm, 97% cotton+3% elastane;
   b. poplin 1/1 weave ratio, NE 60/1×60/1, 66×27, weight 102 gsm, 97% cotton+3% elastane;
   c. sateen 4/1 weave ratio, NE 60/1×60/1+d30, 78×33, weight 117 gsm, 97% cotton+3% elastane;
   d. twill 2/1 weave ratio "S", CM30×CD24+D70, 36×24, weight 168 gsm, 97% cotton+3% elastane;
   e. twill 2/1 weave ratio "S", CM30×CD24+D70, 36×24, weight 168 gsm, 96% cotton+4% elastane, tumbled.

14. A rear projection screen for a display device comprising:
   a flexible white cloth material having a rear surface and a front surface, the flexible cloth material being configured to absorb light emitted by a display device behind the rear surface and to display the light absorbed on the front surface for viewing ahead of the display device, while placed in front of the display device and in contact with a front of the display device.

15. The rear projection screen of claim 14, wherein the cloth material is:
   stretchable in a first direction and not stretchable in a second direction perpendicular to the first direction; or
   stretchable in the first direction and in the second direction.

16. The rear projection screen of claim 14, wherein the cloth material does not crease when crumpled up.

17. The rear projection screen of claim 14, wherein the cloth material comprises a first fabric and elastane, wherein the first fabric comprises at least one of:
   viscose, bamboo, nylon, tnt, cotton, polycotton, polyester, and polypropylene.

18. The rear projection screen of claim 17, wherein the cloth material comprises 90%-99% of the first fabric and 1%-10% of elastane by weight.

19. The rear projection screen of claim 14, wherein the cloth comprises at least one of the following types of fabric:
   a. poplin 1/1 weave ratio, NE 50/1×50/1+d40, 53×27, weight 105 gsm, 97% cotton+3% elastane;
   b. poplin 1/1 weave ratio, NE 60/1×60/1, 66×27, weight 102 gsm, 97% cotton+3% elastane;
   c. sateen 4/1 weave ratio, NE 60/1×60/1+d30, 78×33, weight 117 gsm, 97% cotton+3% elastane;
   d. twill 2/1 weave ratio "S", CM30×CD24+D70, 36×24, weight 168 gsm, 97% cotton+3% elastane;
   e. twill 2/1 weave ratio "S", CM30×CD24+D70, 36×24, weight 168 gsm, 96% cotton+4% elastane, tumbled.

* * * * *